(12) United States Patent
Underhill (10) Patent No.: US 7,557,549 B2
(45) Date of Patent: Jul. 7, 2009

(54) AUTOMATIC OUTPUT MODE SELECT FOR AN ACTUATOR CONTROLLER

(75) Inventor: Michael L. Underhill, Bothell, WA (US)

(73) Assignee: Honeywell International Inc., Morristown, NJ (US)

( * ) Notice: Subject to any disclaimer, the term of this patent is extended or adjusted under 35 U.S.C. 154(b) by 318 days.

(21) Appl. No.: 11/562,318

(22) Filed: Nov. 21, 2006

(65) Prior Publication Data

US 2008/0117559 A1 May 22, 2008

(51) Int. Cl.
*G05F 1/565* (2006.01)
(52) U.S. Cl. ........................ 323/274; 323/275
(58) Field of Classification Search ............... 323/273, 323/274, 275
See application file for complete search history.

(56) References Cited

U.S. PATENT DOCUMENTS

| | | | | |
|---|---|---|---|---|
| 3,986,101 | A | * | 10/1976 | Koetsch et al. ............... 323/275 |
| 4,788,490 | A | | 11/1988 | Valass |
| 5,777,462 | A | * | 7/1998 | Yue ............................ 323/285 |
| 5,832,244 | A | | 11/1998 | Jolley et al. |
| 6,005,414 | A | | 12/1999 | Reay |
| 6,366,064 | B1 | * | 4/2002 | Reichard .................... 323/224 |
| 6,531,896 | B1 | | 3/2003 | Song |
| 6,812,733 | B1 | | 11/2004 | Plasterer et al. |
| 6,847,232 | B2 | | 1/2005 | Tinsley et al. |
| 7,083,109 | B2 | | 8/2006 | Pouchak |
| 2003/0236937 | A1 | | 12/2003 | Barros De Almeida et al. |
| 2006/0164775 | A1 | | 7/2006 | Stineman, Jr. et al. |
| 2007/0018624 | A1 | * | 1/2007 | Guo ........................... 323/282 |
| 2008/0238387 | A1 | * | 10/2008 | Schmeller et al. ........... 323/282 |

OTHER PUBLICATIONS

Alerton, "VAV-SD2A," pp. 1-2, prior to Nov. 21, 2006.
Alerton, "Guide Specification for Section 15900, HVAC Instrumentation and Controls," Open Systems Using BACnet, pp. 1-40, Jan. 2003.

* cited by examiner

*Primary Examiner*—Jeffrey L Sterrett (57) ABSTRACT

Methods and systems are disclosed for automatically controlling the mode of an output that can be coupled to one of several types of actuators or the like. In one illustrative embodiment, an actuator controller is provided that can automatically detect what controlled mode an output of the controller should be set, and set the controlled mode accordingly. In some cases, the actuator controller may monitor a measure related to the resistance of the load, and set the controlled mode of the output to a first controlled mode if the measure that is related to the resistance of the load is below a threshold value, and set the controlled mode of at least selected outputs to a second controlled mode if the measure that is related to the resistance of the load is above a threshold value. The controlled modes may, in some cases, correspond to a current controlled mode and a voltage controlled mode, but this is not required.

19 Claims, 5 Drawing Sheets

Figure 5

AUTOMATIC OUTPUT MODE SELECT FOR AN ACTUATOR CONTROLLER

FIELD

The present invention generally relates to controllers, and more particularly, to actuator controllers.

BACKGROUND

Actuators are used in a wide variety of application often to help control a wide variety of mechanical systems. For example, HVAC actuators are commonly used to control the flow of fluid or gas in an HVAC system. Such HVAC actuators can include, for example, air flow dampers, variable frequency drives, water valves, gas valves, as well as other actuators. In many cases, the actuators may include an actuated part, a motor assembly to move the actuated part, and a driving mechanism, such as a gear train or drive shaft, to transfer the rotational torque from the motor assembly to the actuated part. An actuator controller is often used to provide a drive signal to the motor assembly in order to control the position of the actuated part.

Such actuators often accept either a current based drive signal or a voltage based drive signal from the actuator controller. For example, an actuator may be configured to receive a current drive signal ranging from 4-20 milliamps. Alternatively, an actuator may be configured to receive a voltage drive signal ranging from 0-10 volts. These are only examples. The actuator controller must typically be configured to provide the proper drive signal type for the actuator to operate properly.

In some cases, the actuator controller may include a number of user settable switches (e.g. DIP switches or the like) for each output. An installer must typically manually set these user settable switches to configure the output mode of each output of the actuator controller to match the desired signal type of the connected actuators. For example, the user settable switches may be manually set to configure the output mode of the actuator controller outputs to either a current controlled mode or a voltage controlled mode, depending on the connected actuators. It has been found that manually configuring the output mode of such actuator controllers can be prone to error and/or time consuming for the installers, particularly when an actuator controller has multiple outputs that control multiple, and often different actuators. Thus, costs associated with installation may be reduced. Additionally, by removing the need for configuration switches, the actuator controller may be built at a lower cost.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention generally relates to controllers, and more particularly, to actuator controllers. In one illustrative embodiment, an actuator controller is provided that can automatically detect what controlled mode at least selected outputs should be set, and set the controlled modes accordingly. In some cases, the actuator controller monitors a measure related to the resistance of the load, and sets the controlled mode of at least selected outputs to a first controlled mode if the measure that is related to the resistance of the load is below a threshold value, and sets the controlled mode of at least selected outputs to a second controlled mode if the measure that is related to the resistance of the load is above a threshold value. The controlled modes may, in some cases, correspond to a current controlled mode and a voltage controlled mode.

In another illustrative embodiment, an actuator controller is provided for driving a load having a resistance. The illustrative actuator includes an output that can drive the load in a current controlled mode or a voltage controlled mode. A determining block may be provided for determining a measure related to the resistance of the load. Based on the measure related to the resistance of the load, the actuator controller may automatically determine and set the proper controlled mode of each of the output(s) of the actuator controller. For example, the actuator controller may automatically determine and set the output mode of an output to a current controlled mode if the measure related to the resistance of the load is less than a threshold resistance value, and may determine and set the output mode to a voltage controlled mode if the measure related to the resistance of the load is greater than the threshold resistance value. These, however, are only examples.

BRIEF DESCRIPTION

The invention may be more completely understood in consideration of the following detailed description of various illustrative embodiments of the invention in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

Figure 1:
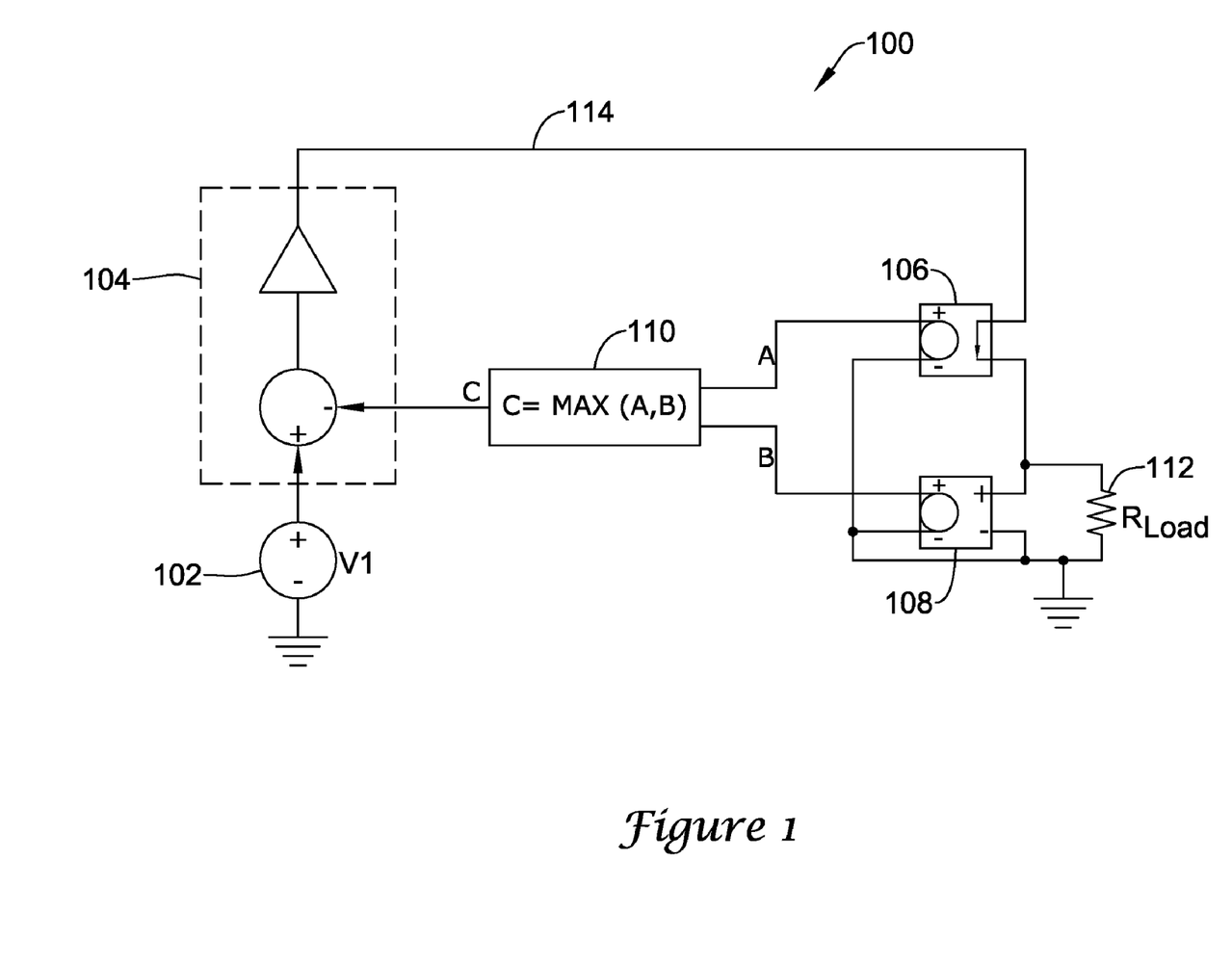
FIG. 1 is a block diagram of an illustrative embodiment of a controller having an analog output signal configurable according to the resistance of the load.

FIG. 1 is a block diagram of an illustrative embodiment of a controller 100 having an analog output signal configurable according to the resistance of a load 112. In the illustrative embodiment, the controller 100 may be configured to drive load 112 according to a measure related to the resistance of the load. In one case, the load 112 may correspond to an actuator for a heating, ventilation, and air conditioning (HVAC) system. However, it is contemplated that the load may correspond to any suitable component to be driven by the controller 100, as desired.

In the illustrative embodiment, the load 112 may be designed to be either voltage controlled or current controlled. For example, an HVAC actuator may include a motor assembly for changing the position of an actuated part. The motor and/or the controller of the motor may be configured to be operated with either a current controlled drive signal or a voltage controlled drive signal. In some cases, a current controlled drive signal may range from 4-20 milliamps, and a voltage controlled drive signal may range from 0-10 volts, but these are just examples.

In the illustrative embodiment, the controller 100 includes a control voltage source 102 for generating a control signal for the actuator, an operational amplifier (op-amp) 104, and a sensing circuit including a current controlled voltage source (CCVS) 106, a voltage controlled voltage source (VCVS) 108, and a compare block 110. In the illustrative embodiment, the control voltage 102 may be a control signal from a controller (e.g. microcontroller or microprocessor) to drive the load 112. For example, in some cases, the control voltage source 102 may be a position signal to drive the motor of an actuator to move an actuated part to a desired position. In some cases, the control voltage 102 may have a voltage designated as V1, which may change over time.

In the illustrative embodiment, op-amp 104 may be configured to control the controller 100 according to the control voltage 102 and a feedback signal designated as C. As illustrated, the op-amp 104 may have two inputs and one output. A first input may be a non-inverting input (+) coupled to the control voltage 102. A second input may be an inverting input (−) coupled to the feedback signal C from the compare block 110. Additionally, although not shown, the op-amp 104 may have a positive power supply and a negative power supply to define the power rails. More specifically, in some cases, the op-amp 104 may be a DC-coupled high-gain electronic voltage amplifier with differential inputs and a single output. Operationally, and although not shown, the output of the op-amp 104 may be controlled by an internal feedback signal, which may be a negative feedback signal. In the negative feedback configuration, the op-amp 104 will try to make the output voltage any suitable voltage that will make the two inputs equal to one another. In other words, the internal feedback signal of the controller 100 may control, at least in part, the drive signal 114 that is provided to the load 112.

In the illustrative embodiment, the current controlled voltage source (CCVS) 106 may be coupled to the drive signal 114. More specifically, the CCVS 106 may have a first side (to the right in FIG. 1) coupled between the drive signal 114 and the load 112 to measure current delivered to the load. The second side, a voltage output (to the left in FIG. 1) of the CCVS 106 may have a positive and negative terminal, with the positive terminal labeled A coupled to the compare block 110 and the negative terminal coupled to ground. The CCVS 106 may be configured to have a transresistance, such that the input current produced by the drive signal 114 may result in a proportional or otherwise related voltage output between the positive and negative terminals of the second side of the CCVS 106. The output of the CCVS 106, from the positive terminal, corresponding to signal A having a voltage, may be fed into the compare block 110 as shown.

In the illustrative embodiment, the CCVS 106 may determine a measure related to the current passing through the load 112. In some cases, the CCVS 106 may control how the current in the drive signal 114 changes as a function of the input voltage 102 when the controller 100 is operating in a current controlled mode. Furthermore, the transresistance of the CCVS 106 may be configurable, as desired. For example, in one illustrative example, if 20 milliamps of current is desired in the drive signal 114 at a control voltage 102 of 3.3 volts, then the CCVS 106 transresistance may be configured to be 3.3 volts/0.020 amps, or 165 volts/amp or ohms.

In the illustrative embodiment, the voltage controlled voltage source (VCVS) 108 may also be coupled to the drive signal 114. More specifically, the VCVS 108 may have a first side (to the right in FIG. 1) with a positive and negative terminal to sense the voltage across the load 112. The positive terminal may be coupled to the drive signal 114 and the negative terminal may be coupled to ground. The second side, a voltage output (to the left in FIG. 1) of the VCVS 108 may have a positive terminal coupled to the compare block 110 and a negative terminal coupled to ground. The VCVS 108 may be configured to have a gain. The positive terminal of the VCVS 108, corresponding to signal B in FIG. 1, may have a voltage that is fed into the compare block 110 as shown.

In some cases, the VCVS 108 may control how the voltage of the drive signal 114 changes as a function of the control voltage 102 when the controller 100 is operating in a voltage controlled mode. Furthermore, the VCVS 108 gain may be configurable, as desired. For example, in one illustrative embodiment, if 10 volts is desired across the load 112 at a control voltage 102 of 3.3 volts, then the VCVS 108 gain may be configured to be 3.3 volts/10 volts, or 0.33.

In the illustrative embodiment, the compare block 110 may be configured to have two inputs, including a first input to receive signal A from the CCVS 106 and a second input to receive signal B from the VCVS 108. The compare block 110 may also have an output, corresponding to signal C, which is coupled to the inverting input of the op-amp 104. The output signal, or signal C, may be a feedback signal for the controller 100. In the illustrative embodiment, and during operation, the compare block 110 may compare voltage signal A and voltage signal B and output a voltage signal equal to the maximum signal of either signal A or B. Furthermore, the voltage output signal C may be forced to be the same voltage, V1, as the control voltage 102 due to the operating of the op-amp 104. Consequentially, if the voltage of signal A is greater than the voltage of signal B, then the CCVS 106 will control the current that is provided to the load 112 by controlling the feedback signal C. Likewise, if the voltage of signal B is greater than the voltage of signal A, then the VCVS 108 will control the voltage across the load 112 by controlling the feedback signal C.

In the illustrative embodiment, the controller 100 may automatically enter the voltage controlled mode (when VCVS 108 is controlling the controller 100) or the current controlled mode (when CCVS 106 is controlling the controller 100) depending on the resistance of the load 112 $R_{Load}$. In some cases, the transition resistance between these two controlled modes may be determined by the CCVS 106 transresistance and the VCVS 108 gain. For example, in the illustrative example, when the CCVS 106 gain is 165 ohms and the VCVS 108 gain is 0.33, the transition resistance may be 165 ohms/0.33, or about 500 ohms. That is, if the resistance of the load 112 $R_{Load}$ is less than 500 ohms, the controller 100 may enter the current controlled mode (when CCVS 106 is controlling the controller 100), and if the resistance of the load 112 $R_{Load}$ is greater than 500 ohms, the controller 100 may enter the voltage controlled mode (when VCVS 108 is controlling the controller 100). As can be seen, the controller 100 may be capable of automatically switching between the current controlled mode and voltage controlled mode according to the resistance of the load 112.

Typically, a motor controller or motor configured to operate in a current controlled mode will have a resistance of about 500 ohms or less, and a motor controller or motor configured to operate in a voltage controlled mode will have a relatively higher resistance, such as about 10,000 ohms or more. Accordingly, for a current controlled configured motor controller or motor with a resistance of 500 ohms or less, the controller 100 will operate in a current controlled mode and for a voltage controlled configured motor controller or motor with a higher resistance, the controller 100 will operate in a voltage controlled mode.

It is to be understood that the 500 ohm transition resistance is merely illustrative, and it is contemplated that any suitable transition resistance or other parameter may be used as desired. Additionally, it is contemplated that the current controlled mode of the controller 100 may be entered when the load resistance is greater than the transition resistance and the voltage controlled mode may be entered when the load resistance is less than the transition resistance, as desired.

Figure 2:
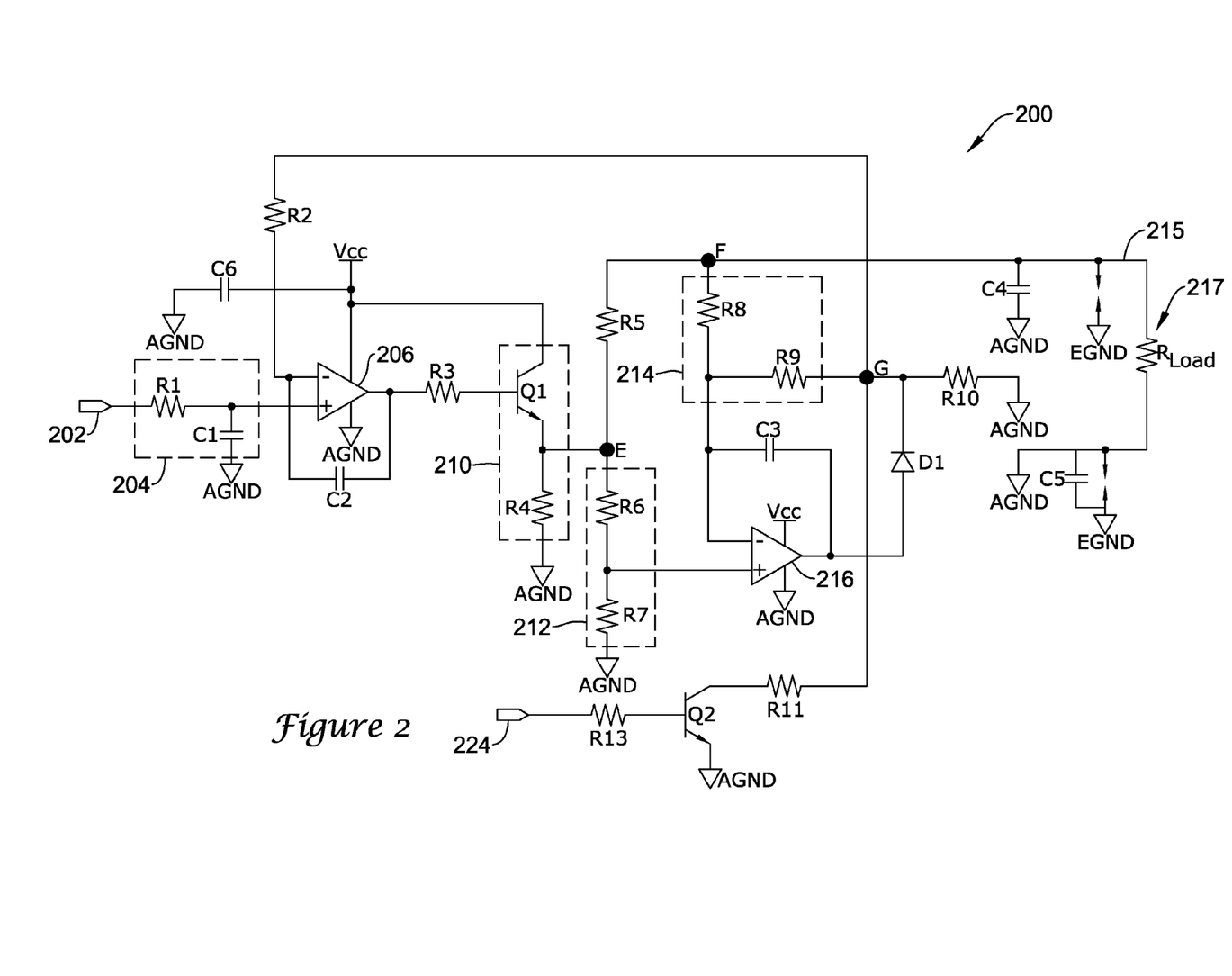
FIG. 2 is a schematic diagram of an illustrative embodiment of a controller having an analog output signal configurable according to the resistance of the load.

FIG. 2 is a schematic diagram of an illustrative controller 200 in accordance with the present invention. The illustrative controller 200 can drive an actuator having a load in a current controlled mode or a voltage controlled mode according to a measure related to the resistance of the load. In the illustrative embodiment, the controller 200 has an input 202 coupled to an output of an actuator controller (e.g. microcontroller or microprocessor) and an output 215 adapted to drive a load 217. In some cases, the input signal 202 may be a pulse width modulated (PWM) signal or other signal, as desired. Similar to above, the load 217 may represent an electrical load of an actuator or any other component, as desired.

In the illustrative embodiment, the input signal 202 of the controller 200 may be coupled to an input of a low pass filter 204 including resistor R1 and capacitor C1. The low pass filter 204 may be a filter that can pass low frequencies below a cutoff frequency and block frequencies above the cutoff frequency. In some cases, the cutoff frequency may be configurable according to the resistance R1 and capacitance C1. For example, in one illustrative embodiment, resistor R1 may be about 200 kilo-ohms and capacitor C1 may be about 0.15 microfarads corresponding to a cutoff frequency of about 5.3 Hz. In essence, the low pass filter 204 can convert the PWM control signal 202 into a corresponding DC control voltage.

The output of the low pass filter 204 may be coupled to a first input of an op-amp 206. Op-amp 206 may have a first input, the non-inverting input (+), coupled to the output of the low pass filter 204 and a second input, the inverting input (−), coupled to a feedback signal of the controller 200. Additionally, op-amp 206 may have a positive supply voltage (VCC) and a negative supply voltage (AGND). In one case, the positive supply voltage may be 21 volts DC and the negative power supply may be appliance ground. However, it is contemplated that any suitable positive and negative power supplies may be used, as desired. In some cases, op-amp 206 may be configured to have an output voltage that forces the non-inverting input voltage to be equal to the inverting input voltage, or in other words, the voltage on the feedback signal is forced to be equal to the input control voltage.

In some cases, op-amp 206 may include stabilization and/or frequency compensation circuitry. In the illustrative embodiment shown in FIG. 2, capacitor C2 and resistor R2 may be provided to help stabilize and/or compensate the frequency response of the op-amp 206. However, it is contemplated that any suitable stabilization and/or frequency compensation circuitry may be used, or in some cases, no stabilization and/or frequency compensation circuitry may need to be provided. In some cases, resistor R2 may be 100 kilo-ohms and C2 may be 1000 pico-farads, but this is only an example.

In the illustrative embodiment, the output signal of the op-amp 206 may be coupled to a resistor R3 and then input into an amplifier stage 210. In the illustrative embodiment, the amplifier stage 210 may be an emitter follower amplifier, but this is not required. The illustrative emitter follower amplifier stage 210 may include a transistor Q1 having the output signal of the op-amp 206 coupled to its base terminal. The collector terminal may be coupled to a voltage source $V_{CC}$, and the emitter terminal may be coupled to a resistor R4, which is coupled to appliance ground. The output signal of the emitter follower amplifier stage 210 may be connected between the emitter of the transistor Q1 and resistor R4, and is label as node E in FIG. 2. In the illustrative embodiment, resistor R3 may be 4.22 kilo-ohms and resistor R4 may be 4.22 kilo-ohms, but these are only examples.

In the illustrative embodiment, a voltage divider 212 may be connected between node E and appliance ground. Voltage divider may include two resistors R6 and R7 having an output connected to a non-inverting input of op-amp 216. In one illustrative embodiment, resistors R6 and R7 of voltage divider 212 may have similar resistances. In this case, the voltage output of the voltage divider 212 may be about one-half of the voltage at node E. In one example, resistors R6 and R7 may be about 100 kilo-ohms.

In the illustrative embodiment, a current sensing resistor R5 may be connected between node E and a node F. The voltage drop across the resistor R5 is related to the current that is passing there through. In one example, the resistance of resistor R5 may be 158 ohms, however, any it is contemplated that any suitable resistance may be used, as desired. During operation, a larger current passing through resistor R5 results in a larger voltage drop across resistor R5. Thus, when $R_{Load}$ has a relatively large resistance value (e.g. voltage controlled motor controller or motor), the voltage drop across R5 will be relatively smaller, and when $R_{Load}$ has a relatively small resistance value (e.g. current controlled motor controller or motor), the voltage drop across R5 will be larger.

In the illustrative embodiment, a second voltage divider 214 is connected between node F and node G. The illustrative voltage divider 214 may include resistors R8 and R9. In one example, the resistance of R8 and R9 may be about equal, and may have resistances of about 100 kilo-ohms. In some cases, a resistor R10 may be connected between node G and appliance ground, and may affect the output of the voltage divider 214. In the illustrative embodiment, R10 may be 75 kilo-ohms, but this is only an example.

In the illustrative embodiment, when $R_{Load}$ is relatively small or less than a transition resistance, which may be 500 ohms, diode D1 is forward biased and a differential amplifier is formed by voltage dividers 212 and 214, and op-amp 216. The differential amplifier output voltage at node G may equal a voltage related to the differential voltage across nodes E and F. Since current sensing resistor R5 is across nodes E and F, a voltage related to the current driven through R5 is produced at node G. Because node G provides a feedback voltage to the inverting input of op-amp 206, node G will be driven by op-amp 206 to match the control voltage at the non-inverting input of op-amp 206. Thus it can be seen that the voltage across R5 will be related to and the control voltage. Because the voltage across R5 is a measure of the current through $R_{Load}$ the controller may be operating in current mode.

In the illustrative embodiment, when $R_{Load}$ is relatively large or greater than a transition resistance, diode D1 is reverse biased enabling a voltage divider formed by resistors R8, R9 and R10 to drive the feedback loop. Thus it can be seen that the voltage at node F will be related to and the control voltage. Because the voltage at node F is a measure of the voltage across $R_{Load}$ the controller may be functioning in voltage mode.

In some cases, it may be desirable to force the controller to current mode operation without regard to the value of $R_{Load}$. By making the switch point resistor sufficiently small, the controller will remain in current mode operation. For example, in one embodiment, R10 is 75 kilo-ohms and a second resistor R11 of 10 kilo-ohms is switched in parallel by turning on transistor Q2.

In the illustrative embodiment, the sensing circuit to sense a measure related to the resistance of the $R_{load}$ 217 may include current sensing resistor R5, a CCVS, and a VCVS. In the illustrative embodiment, the CCVS may include voltage dividers 212 and 214 including resistors R6, R7, R8, and R9, along with op-amp 216. The VCVS may include voltage divider 214 including resistors R8 and R9, along with resistor R10. Accordingly, when in current controlled mode, the op-amp 216 may control the feedback back to amplifier 206, and when in voltage controlled mode, voltage divider 214 and R10 may control the feedback back to amplifier 206.

In some cases, the illustrative controller 200 may include a mode input 224. The mode input 224 may receive a logic signal from the actuator controller (not shown), receiving either a logic zero to automatically select between the current controlled mode and the voltage controlled mode as described above, and receiving a logic one when it is desirable to force the current controlled mode. When activated, transistor Q2 may be turned on, which has a base connected to the mode input 224 via resistor R13, a collector connected to node G via resistor R11, and an emitter connected to appliance ground. When a logic one is provided on mode input 224, the transistor Q2 is on, thereby increasing the voltage output of the voltage divider 214.

Figure 3:
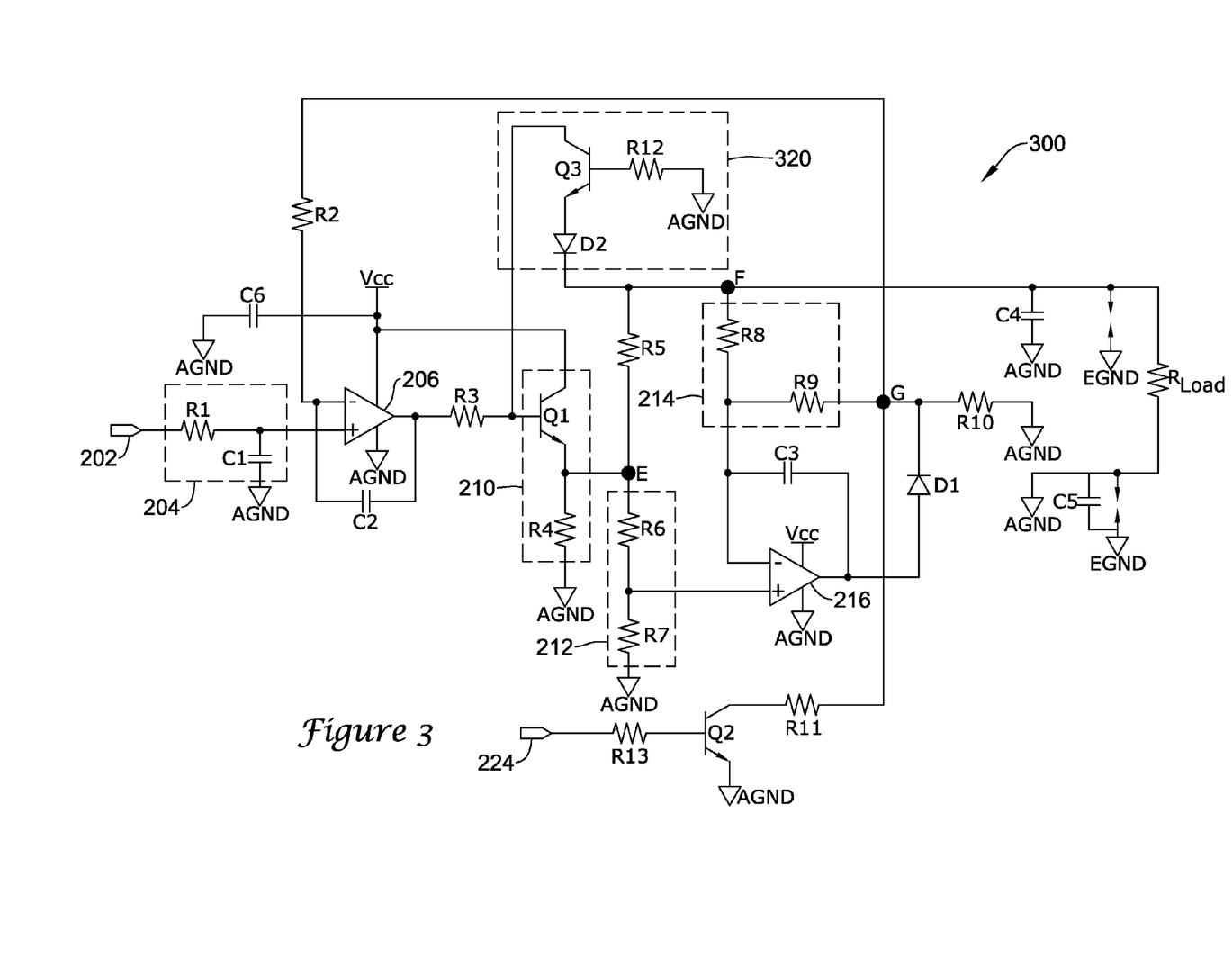
FIG. 3 is a schematic diagram of another illustrative embodiment of a controller having an analog output signal configurable according to the resistance of the load.

FIG. 3 is a schematic diagram of another illustrative embodiment of a controller in accordance with the present invention. The illustrative controller 300 of FIG. 3 is similar to that of FIG. 2 with the addition of protection circuit 320 and a higher stabilization capacitance C2. The protection circuit 320 may be connected between node F and the base terminal of the transistor Q1 in the amplifier stage 210. In some cases, the protection circuit 320 may help protect the circuit from misapplied voltage, such as, for example, if voltage was applied to the output of the circuit.

Protection circuit 320 may include transistor Q3 having a collector terminal connected between R3 and the base of transistor Q1, a base terminal connected to appliance ground through resistor R12, and an emitter terminal connected to the anode of diode D2 having cathode connected to node F. Diode D2 allows current to flow from the emitter of Q1 to node F, but not the other way. In the illustrative embodiment, R12 may be 4.22 kilo-ohms, but this is only an example.

Additionally, the capacitance of the stabilization capacitor C2 may be increased to help stabilize the controller 300. In some cases, this may help the controller 300 yield a higher gain/phase margin for various load capacitances.

Figure 4:
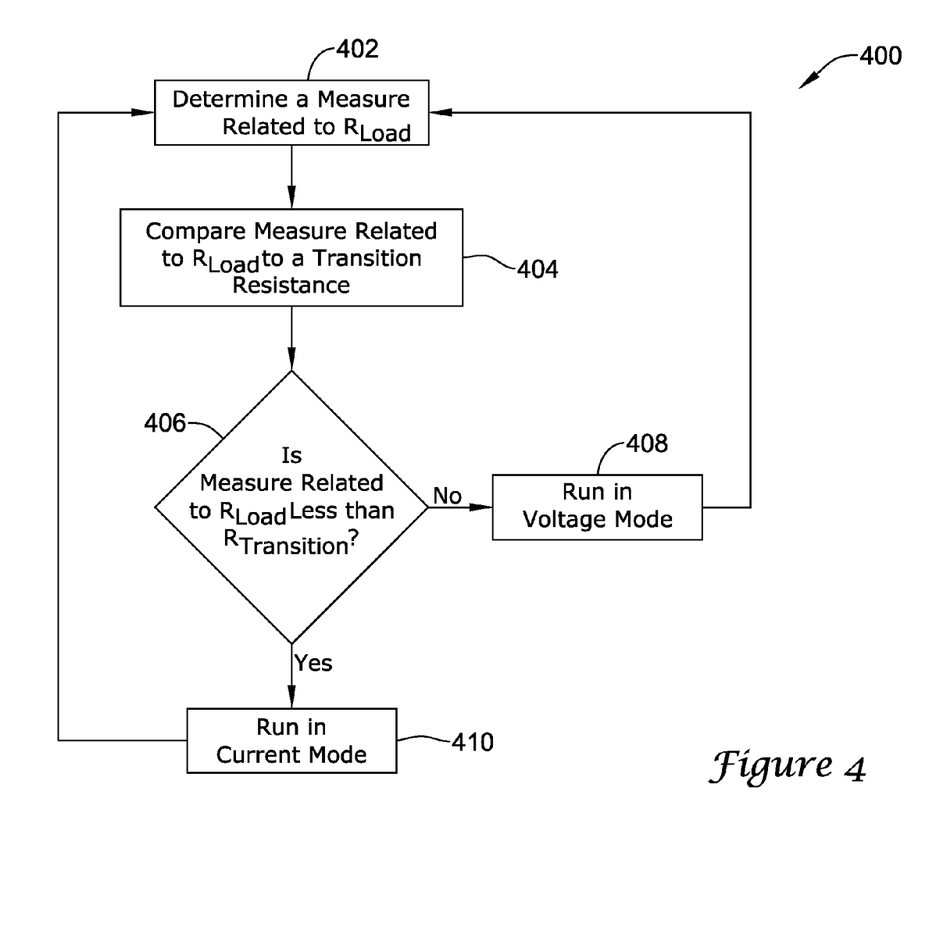
FIG. 4 is a flow diagram of an illustrative method in accordance with the present invention.

FIG. 4 is a flow diagram of an illustrative method in accordance with the present invention. The illustrative method 400 may determine the control mode for an illustrative actuator controller. In step 402, a measure related to the resistance of a load may be determined. In some cases, the measure related to the resistance of the load may be related to the current and/or the voltage across the load. For example, the measure related to the resistance of the load may be related to a measure across a CCVS and/or a measure across a VCVS. However, these are only examples.

In step 404, the measure related to the resistance of the load may be compared to a transition resistance or other threshold. In some cases, the comparison may be between the measure across a CCVS and the measure across a VCVS, but this is only one example.

Then, in step 406, it is determined whether the measure related to the load resistance is less than the transition resistance or other threshold. If the measure related to the resistance of the load is less than the transition resistance or other threshold, then, in step 410, operate in a current controlled mode. However, if the measure related to the resistance of the load is not less than the transition resistance or other threshold, then, in step 408, operate in a voltage controlled mode. Then, in some cases, the illustrative method may return back to step 402 and repeat the illustrative steps, but this is not required.

Figure 5:
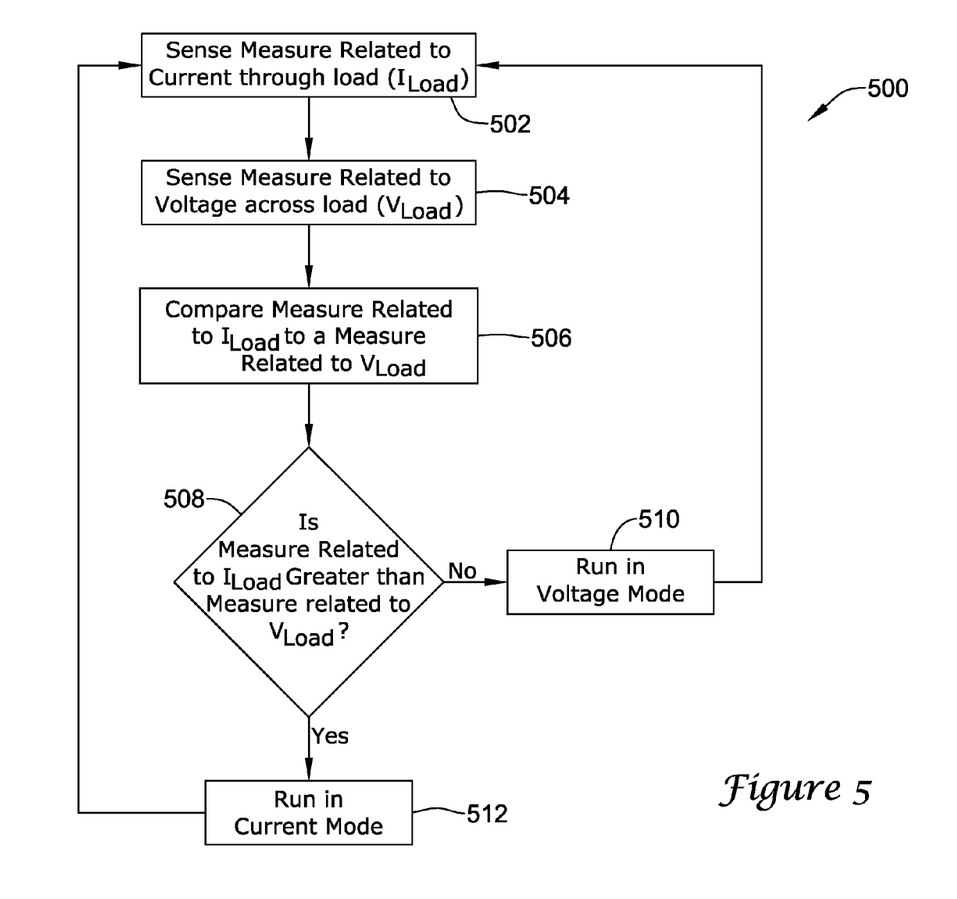
FIG. 5 is a flow diagram of another illustrative method in accordance with the present invention.

FIG. 5 is a flow diagram of another illustrative method 500 in accordance with the present invention. In step 502, a measure related to the current across the load ($I_{Load}$) is sensed or otherwise determined. In some cases, the measure related to the current across the load may be voltage signal A (FIG. 1), resulting from a CCVS having a transresistance. However, this is just one example way of detecting a measure related to the current across the load.

In step 504, a measure related to the voltage across the load ($V_{Load}$) is sensed or otherwise determined. In some cases, the measure related to the voltage across the load may be voltage signal B (FIG. 1), resulting from a VCVS having a gain. However, this is just one example way of detecting a measure related to the voltage across the load. It is contemplated that steps 502 and 504 may be performed in any order, or simultaneously, as desired.

In step 506, the measure related to the current across the load may be compared to the measure related to the voltage across the load. In some cases, this may be performed by the compare block of FIG. 1 comparing voltage signal A to voltage signal B, but this is just one example. For example, it may also be performed by op-amp 216 comparing its two inputs, or by any other suitable method.

Then, in step 508, it is determined whether the measure related to the current across the load is greater than the measure related to the voltage across the load. If the measure related to the current across the load is greater than the measure related to the voltage across the load, then, in step 512, operate in current controlled mode. However, if the measure related to the current across the load is not greater than the measure related to the voltage across the load, then, in step 510, operate in voltage controlled mode.

In some embodiments, if the measure related to the current across the load is greater than or equal to the measure related to the voltage across the load, then, in step 512, operate in current controlled mode, and if the measure related to the current across the load is less than the measure related to the voltage across the load, then, in step 510, operate in voltage controlled mode, if desired. Also, in some cases, the illustrative method may return back to step 502 and repeat the illustrative steps, but this is not required.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A controller adapted to drive a load, wherein the load has a resistance, comprising:
  an output that can drive the load in either a current controlled mode or a voltage controlled mode;

a determining block for determining a measure related to the resistance of the load, wherein the determining block includes a current sensing block and a voltage sensing block, the current sensing block is configured to sense a measure related to the current passing through the load, the voltage sensing block is configured to sense a measure related to a voltage across the load, wherein the measure related to the resistance of the load is determined by comparing the measure related to the current passing through the load and the measure related to the voltage across the load; and wherein the controller enters one of the current controlled mode or the voltage controlled mode depending on the measure related to the resistance of the load determined by the determining block.

2. The controller of claim 1 wherein the controller automatically enters either the current controlled mode or the voltage controlled mode according to the determined measure related to the resistance of the load.

3. The controller of claim 1 wherein the current controlled mode is entered if the measure related to the load resistance is less than a threshold value.

4. The controller of claim 3 wherein the voltage controlled mode is entered if the measure related to the load resistance is greater than the threshold value.

5. The controller of claim 4 wherein the threshold value corresponds to a resistance value of about 500 ohms.

6. The controller of claim 1 wherein the current sensing block includes a current controlled voltage source (CCVS) that has an op-amp and at least two voltage dividers.

7. The controller of claim 6 wherein the voltage sensing block includes a voltage controlled voltage source (VCVS) that has at least one voltage divider.

8. The controller of claim 7 wherein either the current controlled voltage source or the voltage controlled voltage source are configured to control a feedback path that is used to at least partially control a drive signal to the load.

9. A method for driving a load in either a voltage controlled mode or a current controlled mode, the method comprising:
determining a measure related to the resistance of the load;
comparing the measure related to the resistance of the load to a threshold resistance; and
automatically driving the load in the current controlled mode if the measure related to the resistance of the load is below the threshold resistance; and
automatically driving the load in the voltage controlled mode if the measure related to the resistance of the load is above the threshold resistance.

10. The method of claim 9 wherein the threshold resistance corresponds to a resistance value of about 500 ohms.

11. A method for driving an actuator in either a voltage controlled mode or a current controlled mode, the method comprising:
determining a measure related to the current passing through the load;
determining a measure related to the voltage across the load; and
comparing the measure related to the current through the load to the measure related to the voltage across the load.

12. The method of claim 11 further comprising:
driving the actuator in the current controlled mode if the measure related to the current passing through the load is greater than the measure related to the voltage across the load; and
driving the actuator in the voltage controlled mode if the measure related to the voltage across the load is greater than the measure related to the current passing through the load.

13. The method of claim 12 wherein the measure related to the current passing through the load is provided by a current controlled voltage source (CCVS) having a transresistance.

14. The method of claim 13 wherein the measure related to the voltage across the load is provided by a voltage controlled voltage source (VCVS) having a gain.

15. The method of claim 14 wherein the transresistance of the current controlled voltage source (CCVS) is adjustable.

16. The method of claim 15 wherein the gain of the voltage controlled voltage source (VCVS) is adjustable.

17. A controller adapted to drive a load, wherein the load can be of a first type or a second type, the first type of load is expecting to be driven in a current controlled mode and the second type of load is expecting to be driven in a voltage controlled mode, the controller comprising:
an output that can be used to drive the load in either a current controlled mode or a voltage controlled mode;
a control circuit for automatically determining whether the load is of the first type or the second type, and for automatically driving the output of the controller in the current controlled mode if the load is of the first type and for automatically driving the output of the controller in the voltage controlled mode if the load is of the second type, wherein the control circuit includes a current sensing block and a voltage sensing block, the current sensing block being configured to sense a measure related to the current passing through the load, and the voltage sensing block being configured to sense a measure related to a voltage across the load, wherein the load type is determined by comparing the measure related to the current passing through the load and the measure related to the voltage across the load.

18. The controller of claim 17 wherein the control circuit has a feedback signal that is used to help control the drive delivered to the load, wherein the feedback signal is dependent on the current delivered to the load when the load is of the first type, and the feedback signal is dependent on the voltage across the load when the load is of the second type.

. 19. The controller of claim 17 wherein the load is the first type when the measure related to the current passing through the load is greater than the measure related to the voltage across the load, and wherein the load is the second type when the measure related to the voltage across the load is greater than the measure related to the current passing through the load.

* * * * *